(12) United States Patent
Ji et al.

(10) Patent No.: US 11,977,562 B2
(45) Date of Patent: May 7, 2024

(54) KNOWLEDGE BASE FOR CORRECTING BASELINE FOR CLUSTER SCALING

(71) Applicant: Dell Products L.P., Round Rock, TX (US)

(72) Inventors: Jim Lewei Ji, Shanghai (CN); Edward Guohua Ding, Shanghai (CN); Tianming Zhang, Brighton, MA (US)

(73) Assignee: Dell Products L.P., Round Rock, TX (US)

( * ) Notice: Subject to any disclaimer, the term of this patent is extended or adjusted under 35 U.S.C. 154(b) by 69 days.

(21) Appl. No.: 17/551,508

(22) Filed: Dec. 15, 2021

(65) Prior Publication Data
US 2023/0185829 A1  Jun. 15, 2023

(51) Int. Cl.
G06F 16/00 (2019.01)
G06F 16/21 (2019.01)
G06F 16/28 (2019.01)

(52) U.S. Cl.
CPC .......... G06F 16/285 (2019.01); G06F 16/219 (2019.01)

(58) Field of Classification Search
CPC .................................................... G06F 16/285
USPC ........................................................ 707/740
See application file for complete search history.

(56) References Cited

U.S. PATENT DOCUMENTS

| 10,594,792 | B1* | 3/2020 | Danilov | G06F 3/0607 |
| | | | | 707/707 |
| 11,150,895 | B1* | 10/2021 | Wall | G06F 8/65 |
| | | | | 707/707 |
| 2020/0201666 | A1* | 6/2020 | Aron | H04L 67/53 |
| | | | | 707/707 |
| 2021/0149744 | A1* | 5/2021 | Sharma | G06F 11/3006 |
| | | | | 707/707 |
| 2023/0105203 | A1* | 4/2023 | Reeve | G06F 11/3409 |
| | | | | 714/38.1 |

* cited by examiner

*Primary Examiner* — Alexandria Y Bromell
(74) *Attorney, Agent, or Firm* — Jackson Walker L.L.P.

(57) ABSTRACT

An information handling system may include at least one processor and a non-transitory memory coupled to the at least one processor. The information handling system may be configured to: transmit a request to a remote information handling system regarding an upcoming cluster scaling event for an information handling system cluster; receive information from the remote information handling system indicative of a plurality of known-good cluster configurations; determine a closest one of the plurality of known-good cluster configurations; make one or more configuration changes to the information handling system cluster to cause a configuration of the information handling system cluster to match the closest one; and initiate the cluster scaling event.

12 Claims, 2 Drawing Sheets

KNOWLEDGE BASE FOR CORRECTING BASELINE FOR CLUSTER SCALING

TECHNICAL FIELD

The present disclosure relates in general to information handling systems, and more particularly to cluster scaling events in a cluster environment such as a hyper-converged infrastructure (HCI) cluster.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Hyper-converged infrastructure (HCI) is an IT framework that combines storage, computing, and networking into a single system in an effort to reduce data center complexity and increase scalability. Hyper-converged platforms may include a hypervisor for virtualized computing, software-defined storage, and virtualized networking, and they typically run on standard, off-the-shelf servers. One type of HCI solution is the Dell EMC VxRail™ system. Some examples of HCI systems may operate in various environments (e.g., an HCI management system such as the VMware® vSphere® ESXi™ environment, or any other HCI management system). Some examples of HCI systems may operate as software-defined storage (SDS) cluster systems (e.g., an SDS cluster system such as the VMware® vSAN™ system, or any other SDS cluster system).

In the HCI context (as well as other contexts), it may be desirable to adjust the size of a cluster from time to time. For example, nodes may be added if a workload grows, or nodes may be removed if a workload shrinks or the node is needed elsewhere. In general, these procedures are referred to as cluster scaling. Often, scaling operations may take place while the cluster is still operating, and so there are potential risks involved. For the sake of clarity and exposition, the example of cluster expansion will be discussed in detail herein.

For example, a new node that is to be added to a cluster may include components (e.g., software and/or firmware components) that are not the same version as corresponding components of the target cluster. Typically only certain combinations of component versions are rigorously tested and certified as known-good, and so it is undesirable to add a node that has such differences to a cluster. This risk is also exacerbated by the possibility of a customer downloading software or firmware components manually, instead of applying them through a cluster management system.

Embodiments of this disclosure may reduce such risks by correcting the baseline of a cluster prior to a cluster scaling event, in order to align the cluster with a known-good configuration. For purposes of this disclosure, the term "baseline" refers to various metrics of a cluster, including information such as versions of various software and firmware components. In some embodiments, the baseline may also refer to configuration settings, variables, and the like.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with cluster scaling may be reduced or eliminated.

In accordance with embodiments of the present disclosure, an information handling system may include at least one processor and a non-transitory memory coupled to the at least one processor. The information handling system may be configured to: transmit a request to a remote information handling system regarding an upcoming cluster scaling event for an information handling system cluster; receive information from the remote information handling system indicative of a plurality of known-good cluster configurations; determine a closest one of the plurality of known-good cluster configurations; make one or more configuration changes to the information handling system cluster to cause a configuration of the information handling system cluster to match the closest one; and initiate the cluster scaling event.

In accordance with these and other embodiments of the present disclosure, a method may include transmitting a request to a remote information handling system regarding an upcoming cluster scaling event for an information handling system cluster; receiving information from the remote information handling system indicative of a plurality of known-good cluster configurations; determining a closest one of the plurality of known-good cluster configurations; making one or more configuration changes to the information handling system cluster to cause a configuration of the information handling system cluster to match the closest one; and initiating the cluster scaling event.

In accordance with these and other embodiments of the present disclosure, an article of manufacture may include a non-transitory, computer-readable medium having computer-executable code thereon that is executable by a processor of an information handling system for: transmitting a request to a remote information handling system regarding an upcoming cluster scaling event for an information handling system cluster; receiving information from the remote information handling system indicative of a plurality of known-good cluster configurations; determining a closest one of the plurality of known-good cluster configurations; making one or more configuration changes to the information handling system cluster to cause a configuration of the information handling system cluster to match the closest one; and initiating the cluster scaling event.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
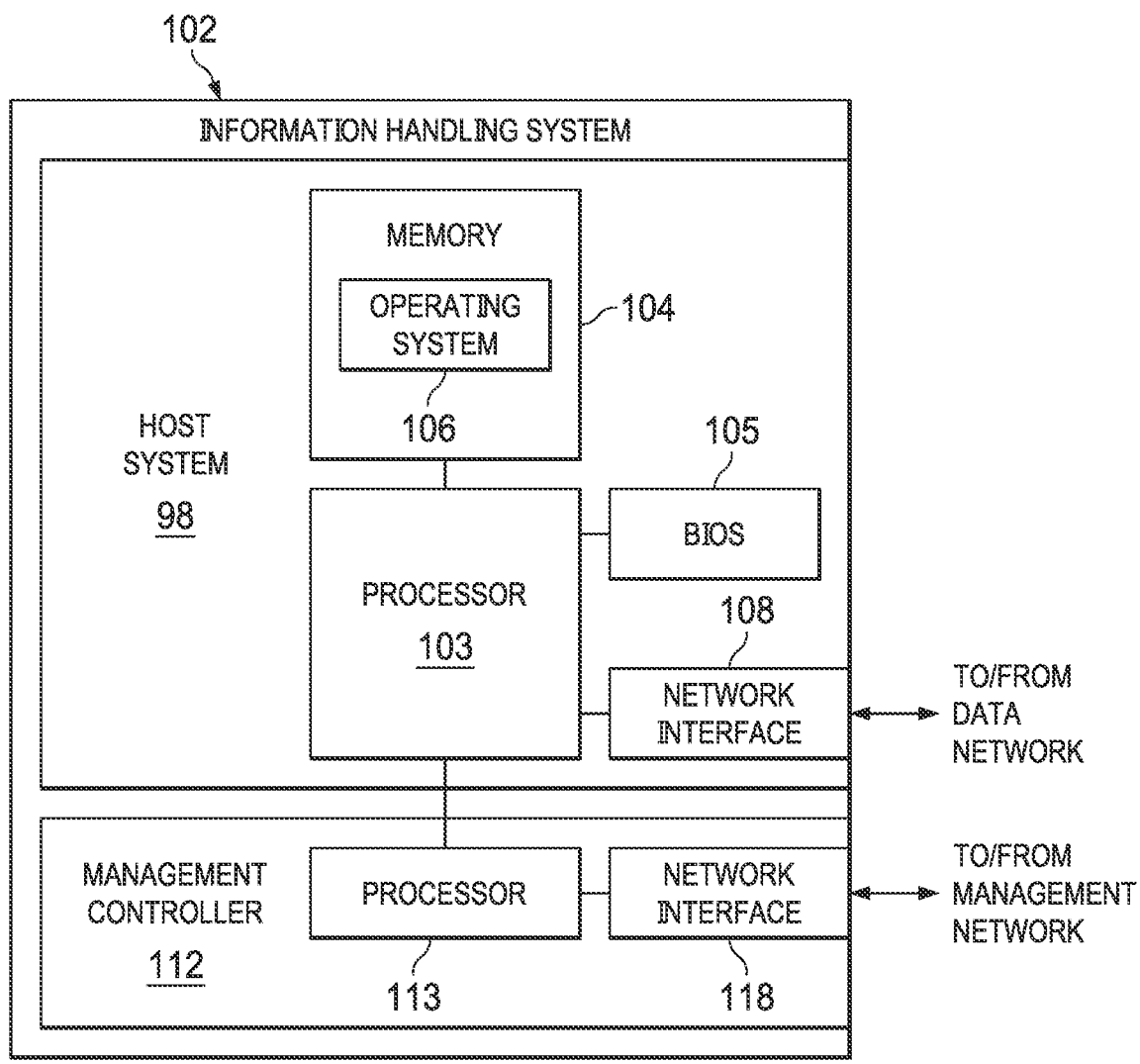
FIG. 1 illustrates a block diagram of an example information handling system, in accordance with embodiments of the present disclosure.
Figure 2:
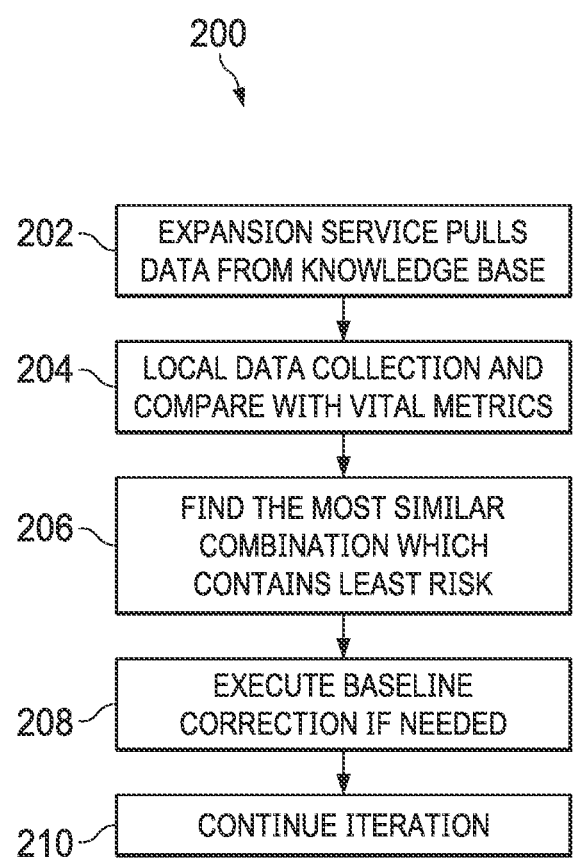
FIG. 2 illustrates an example method, in accordance with embodiments of the present disclosure.

Preferred embodiments and their advantages are best understood by reference to FIGS. 1 and 2, wherein like numbers are used to indicate like and corresponding parts. For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102. Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

As discussed above, embodiments of this disclosure relate to increasing the probability of success of a cluster scaling event. As one example of a cluster scaling event, an additional information handling system 102 may be added to an existing cluster of information handling systems 102 (e.g., an HCI cluster).

Embodiments may provide such improvements by relying on information relating to known-good cluster baseline configurations for which cluster scaling events have been tested. This information may be is stored in a centralized datacenter known as a knowledge base.

At a high level, one embodiment may proceed as follows.
1. The manufacturer may test various combinations of cluster configurations with configurations for a new node to determine which combinations are verified to work correctly in a cluster expansion event.
2. A database may be constructed at the knowledge base. In one embodiment, the database may be populated with records for each new node version, including information about each cluster baseline configuration that is known to be compatible with that node version. For example, a one-to-many mapping may be constructed from the node version to the cluster baseline configurations.
3. Each cluster configuration may include various sub-components (e.g., firmware components, drivers, OS components, other software components, etc.), each of which may be upgradeable to a number of different versions.
4. An expansion engine may execute (e.g., as a component within the cluster environment or on a separate system that is communicatively coupled to the cluster) to determine a known-good configuration from the knowledge base that is closest to the current cluster configuration. In one embodiment, the determination of which known-good configuration is closest may be based on the following steps:
   a. Determine how many sub-components have deviations between the cluster configuration and the known-good configuration. A smaller number of deviations corresponds to a closer configuration. If there is a unique known-good configuration with the minimum number of deviations, that is the closest configuration.
   b. If there are multiple known-good configurations that have the same minimum number of deviations, then determine how large a "gap" exists in the versions for each deviation. In one embodiment, version numbers may be styled as MAJOR.MINOR.PATCH to indicate the seriousness of the changes between versions. In this scheme, numerical differences in major version numbers may be given a large weighting, numerical differences in minor version numbers may be given an intermediate weighting, and numerical difference is patch version numbers may be given a small weighting. The gap information may then be summed up over all of the sub-components, and an overall gap score may be determined. The configuration with the minimum gap sum is then considered the closest configuration.
5. The cluster expansion engine may then execute upgrade and/or downgrade processes for each sub-component that deviates from the closest known-good configuration. These upgrade/downgrade processes may execute both on the existing cluster and on the node that is to be added. For example, if the closest known-good configuration corresponds to a different software version on the new node, then changes can take place on the node. If the closest known-good configuration corresponds to the existing node configuration, then no changes to the node are necessary, and the changes may take place only on the cluster.
6. The expansion engine may continue making such changes until the cluster and node have reached a baseline configuration that is the same as a known-good configuration.

Table 1 below provides an example of a cluster expansion in which two known-good configurations are found in the knowledge base. Table 1 describes the version numbers for the HCI management software installed on the cluster and the node, as well as the version for various modules (e.g., software or firmware) that are installed on the cluster. The modules that deviate from the actual cluster are highlighted.

Although Table 1 provides one example, one of ordinary skill in the art with the benefit of this disclosure will understand that the actual values and weights ascribed to deviations can be tailored to a given situation based on real-world factors.

TABLE 1

| Cluster Version | Node Version | Module #1 | Module #2 | Module #3 | Module #4 | Module #5 | Module #5 |
|---|---|---|---|---|---|---|---|
| Actual Cluster ||||||||
| 7.0.100 | 7.0.010 | 2.3.7-1 | 2.14.5 | 5.7 | 4.8 | 10.12 | 2.11.12 |
| Known-Good Configuration 1 ||||||||
| 7.0.100 | 7.0.010 | 2.3.7-1 | 2.14.5 | 5.7 | 4.7 | 10.11 | 2.11.11 |
| Known-Good Configuration 2 ||||||||
| 7.0.101 | 7.0.010 | 2.3.7-1 | 2.14.5 | 5.7 | 4.8.1 | 10.12 | 2.11.12 |

In this example, known-good configuration 2 has a smaller deviation than known-good configuration 1 (e.g., because only two components deviate instead of three). Further, some embodiments of this disclosure may additionally take into account the amount of deviation within each deviating component. For example, the risk of a patch version upgrade in Module #4 from version 4.8 to version 4.8.1 may be relatively small, whereas the risk of a minor version downgrade from version 4.8 to version 4.7 may be larger.

Turning now to FIG. 2, a flow chart is shown of an example method 200 for correcting the baseline configuration of a cluster and/or node prior to a cluster expansion event. At step 202, the node expansion service may retrieve data from the knowledge base relating to known-good configurations that have been tested in a cluster expansion scenario.

At step 204, the expansion service may collect data from the local cluster environment regarding vital metrics (e.g., version numbers of various components). This data may be compared with the information retrieved from the knowledge base.

At step 206, the expansion service may determine which known-good configuration is most similar to the actual cluster configuration. The most similar configuration is typically the least risky option when considering what changes to make to the cluster.

At step 208, if a change is needed to bring the cluster environment into line with the configuration selected at step 206, such change is carried out. For example, a component of the cluster may be upgraded or downgraded in this step.

At step 210, iteration may continue for each component of the cluster. Any components that need to be upgraded or downgraded are identified, and the necessary changes are carried out.

After step 210, the cluster should be in the known-good baseline configuration. The cluster expansion event can then proceed, and the user may be confident that it will succeed.

As one of ordinary skill in the art with the benefit of this disclosure will appreciate, many of the steps of method 200 may be performed at the customer site, at the knowledge base, or elsewhere in various embodiments.

One of ordinary skill in the art with the benefit of this disclosure will understand that the preferred initialization point for the method depicted in FIG. 2 and the order of the steps comprising that method may depend on the implementation chosen. In these and other embodiments, this method may be implemented as hardware, firmware, software, applications, functions, libraries, or other instructions. Further, although FIG. 2 discloses a particular number of steps to be taken with respect to the disclosed method, the method may be executed with greater or fewer steps than depicted. The method may be implemented using any of the various components disclosed herein (such as the components of FIG. 1), and/or any other system operable to implement the method.

Although various possible advantages with respect to embodiments of this disclosure have been described, one of ordinary skill in the art with the benefit of this disclosure will understand that in any particular embodiment, not all of such advantages may be applicable. In any particular embodiment, some, all, or even none of the listed advantages may apply.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
   at least one processor; and
   a non-transitory memory coupled to the at least one processor;
   wherein the information handling system is configured to:
   transmit a request to a remote information handling system regarding an upcoming cluster scaling event for an information handling system cluster;
   receive information from the remote information handling system indicative of a plurality of known-good cluster configurations;
   determine a most-similar one of the plurality of known-good cluster configurations, wherein the most-similar one is determined based on how many components of the information handling system cluster have version numbers that are different from corresponding version numbers of corresponding components of the plurality of known-good cluster configurations;
   make one or more configuration changes to the information handling system cluster to cause a configuration of the information handling system cluster to match the most-similar one; and
   initiate the cluster scaling event.

2. The information handling system of claim 1, wherein the information handling system cluster is a hyper-converged infrastructure (HCI) cluster.

3. The information handling system of claim 1, wherein the most-similar one is further determined based on a sum of version number differences for the components.

4. The information handling system of claim 3, wherein the sum is based on a version number weighting in which:
   major version numbers correspond to a first weighting;
   minor version numbers correspond to a second weighting smaller than the first weighting; and
   patch version numbers correspond to a third weighting smaller than the second weighting.

5. A computer-implemented method comprising:
   transmitting a request to a remote information handling system regarding an upcoming cluster scaling event for an information handling system cluster;
   receiving information from the remote information handling system indicative of a plurality of known-good cluster configurations;
   determining a most-similar one of the plurality of known-good cluster configurations, wherein the most-similar one is determined based on how many components of the information handling system cluster have version numbers that are different from corresponding version numbers of corresponding components of the plurality of known-good cluster configurations;
   making one or more configuration changes to the information handling system cluster to cause a configuration of the information handling system cluster to match the most-similar one; and
   initiating the cluster scaling event.

6. The method of claim 5, wherein the cluster scaling event is a cluster expansion event.

7. The method of claim 5, wherein the most-similar one is further determined based on a sum of version number differences for the components.

8. The method of claim 7, wherein the sum is based on a version number weighting in which:
   major version numbers correspond to a first weighting;
   minor version numbers correspond to a second weighting smaller than the first weighting; and
   patch version numbers correspond to a third weighting smaller than the second weighting.

9. An article of manufacture comprising a non-transitory, computer-readable medium having computer-executable code thereon that is executable by a processor of an information handling system for:
   transmitting a request to a remote information handling system regarding an upcoming cluster scaling event for an information handling system cluster;
   receiving information from the remote information handling system indicative of a plurality of known-good cluster configurations;
   determining a most-similar one of the plurality of known-good cluster configurations, wherein the most-similar one is determined based on how many components of the information handling system cluster have version numbers that are different from corresponding version numbers of corresponding components of the plurality of known-good cluster configurations;
   making one or more configuration changes to the information handling system cluster to cause a configuration of the information handling system cluster to match the most-similar one; and
   initiating the cluster scaling event.

10. The article of claim 9, wherein the remote information handling system clusters each comprise hyper-converged infrastructure (HCI) clusters.

11. The article of claim 9, wherein the most-similar one is further determined based on a sum of version number differences for the components.

12. The article of claim 11, wherein the sum is based on a version number weighting in which:
    major version numbers correspond to a first weighting;
    minor version numbers correspond to a second weighting smaller than the first weighting; and
    patch version numbers correspond to a third weighting smaller than the second weighting.

* * * * *